Feb. 6, 1951   A. J. VASSELLI   2,540,224
INTERMITTENT MOTION MECHANISM
Filed Dec. 11, 1947

INVENTOR.
Anthony J. Vasselli
BY
Angelo M. Pisarra
ATTORNEY

Patented Feb. 6, 1951

2,540,224

UNITED STATES PATENT OFFICE 2,540,224

INTERMITTENT MOTION MECHANISM

Anthony J. Vasselli, Newark, N. J.

Application December 11, 1947, Serial No. 790,963

6 Claims. (Cl. 74—436)

This invention relates to mechanism for converting continuous motion to intermittent motion. Heretofore it has been customary to employ for that purpose a continuously driven input shaft and an output shaft intermittently driven thereby through a mechanism associated with said shafts and driven by the input shaft to impart intermittent rotation to the output shaft. The mechanisms commonly employed for this purpose have been the well known Geneva mechanism and equivalent mechanism such as the index plate and drive mechanism. When the Geneva mechanism is employed, usually a Geneva wheel is keyed to the output shaft and a crank for intermittently driving the Geneva wheel is driven by the continuously driven input shaft; and when the index plate and drive mechanism is employed, usually the index plate having a plurality of rollers circumferentially spaced thereon is keyed to the output shaft and a cam, worm or other element is continuously driven by the input shaft whereby it contracts the rollers to intermittently drive the index plate.

Each of these various mechanisms for converting continuous motion to rotary motion was designed to provide intermittent rotation of predetermined magnitude of the output shaft, which for example might be 10°, 20°, 45°, etc. Heretofore once any of these mechanisms was designed and produced, it could serve merely to provide intermittent motion at the output shaft only of the magnitude for which it was designed. Consequently, when output shaft intermittent rotation of some other magnitude was required, it was necessary to redesign and make an entirely new unit in which might be used only a few of the parts of the original mechanism. This type of changeover has been expensive, because of the necessity of (1) redesigning, (2) using different parts, (3) labor cost and (4) non-production time required for changeover. In some cases, it has been necessary to provide a completely new unit having none of the parts of the original unit resulting in the accumulation of a number of mechanisms which would be stored in the hope of some day finding use for them. These disadvantages inherent in these devices and the necessity for such methods of changeover are readily apparent from the following example of such a mechanism in which a Geneva mechanism is employed. Assuming that the magnitude of the intermittent motion of the output shaft was 45° and the Geneva wheel employed was approximately 5" in diameter and it is desired to change the magnitude of intermittent motion to 10° at the output shaft, in order to obtain the 10° motion, a newly designed Geneva wheel of approximately 23" diameter would be required and the other parts and the positions thereof relative to the others would have to be changed so that a substantially new and larger unit would be required for that purpose.

In the course of my experimentations with these various mechanisms for converting continuous motion to intermittent motion, I have discovered that I may provide such mechanisms so modified that most of its parts become standard, need not be changed and include a set of gears which may be replaced by other sets of gears of different gear ratios to vary the magnitude of intermittent rotation of an output shaft whenever desired. This may be accomplished at a relatively low cost, in a simple manner even by an unskilled workman, in a short period of time and by the use of relatively inexpensive and for the most part standard equipment. Thus, according to this invention, I have provided novel mechanisms wherein by a mere change of one set of gears for another the magnitude of intermittent rotation of its output shaft may be varied and thus the main or chief part of the mechanism has a wide range of use and serves to provide a wide range of intermittent motion at its output shaft dependent upon the gear ratio of the set of gears employed.

Other advantages of the invention will be apparent from the following description and drawings, wherein.

Figure 1:
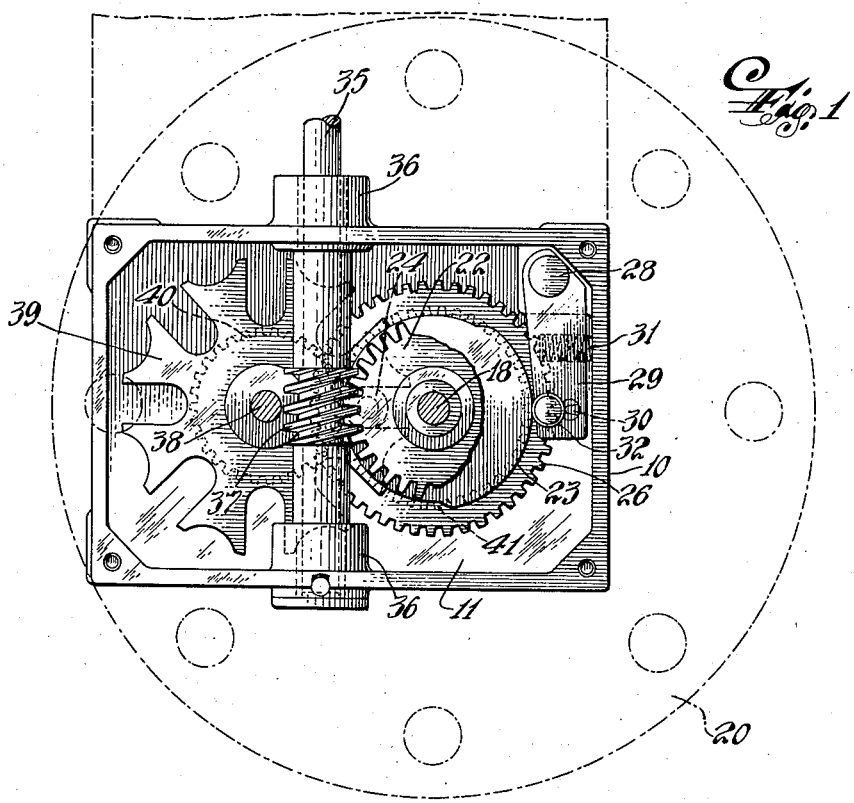
Fig. 1 is a view in side elevation of the apparatus embodying my invention, with a side plate of the housing removed.
Figure 2:
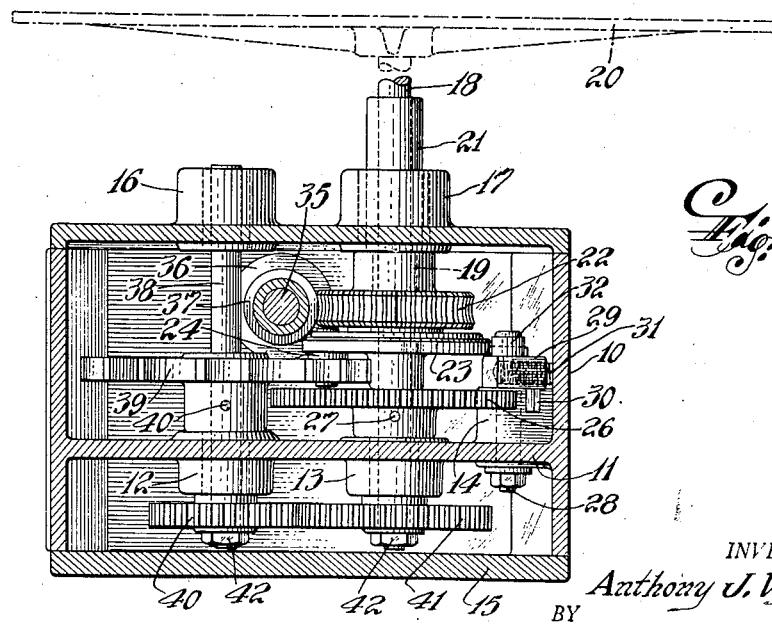
Fig. 2 is a view taken at right to the view of Fig. 1 but with the housing being in section.

Merely for the purposes of illustrating the invention and not in a limiting sense, an embodiment of the invention shall be described in a mechanism in which a Geneva mechanism is employed. It is apparent of course that other mechanism may be substituted for accomplishing the same purpose as the Geneva mechanism.

As shown in the drawings, there is a box support or housing 10 having an intermediate supporting plate 11 secured to the sides thereof and having three bearings 12, 13 and 14 therein. The housing 10 has a cover or sealing plate 15 which is detachably secured thereto in any convenient and desired manner. The side of the housing 10 opposite the cover plate 15 has a pair of bearings 16 and 17 in alignment with the respective bearings 12 and 13. Extending through the aligned bearings 13 and 17 is an output member or shaft 18. Keyed to one end of the shaft 18 is a table or other work support 20 which is to be intermittently driven therewith. Mounted freely for independent rotation on the shaft 18 is a short hollow shaft 19 having keyed thereto a gear 22 and a cam 23 pinned to each other. The hollow shaft 19 has an enlarged portion 21 extending outwardly beyond bearing 17. Supported by the cam 23 and carried thereby is a drive roller 24. Fixedly mounted on the shaft 18 by retaining pin 27 is a locking gear 26. Mounted in the bearing 14 is a pivot rod 28 extending through one end of a locking lever 29 having a locking tooth 30 extending therefrom. The lever 29 has a recess in the side thereof in which is located a coiled compression spring 31 bearing against the end of said recess and against a face of one of the walls of housing 14 adjacent thereto. Also carried by the free end of the lever 29 is a cam follower roller 32 maintained at all times in contact with the cam face of cam 23 by the action of spring 31 normally tending to maintain the lever 29 in locking engagement with the lock gear 26.

The hollow shaft 21 is an input member which may be continuously driven by a shaft 35 mounted in bearings 36 in opposite sides of the housing 10, having keyed thereto a worm drive 37 intermeshing with the gear 22. The shaft 35 may be the output shaft of an electric motor or other source of power input.

Disposed substantially parallel to the continuously rotatable shaft 21 and to the output shaft 18 which extends therethrough is an intermittently rotatable shaft 38 having a Geneva wheel 39 coupled thereto by retaining pin 40. The Geneva wheel 39 as shown and the drive roller 24 cooperate with each other so that each complete turn of the shaft 21 drives the shaft 38 only 45° or one-eighth of a turn.

Demountably connected to the output shaft 18 and the intermittently driven shaft 38 at the ends thereof between the intermediate plate 11 and cover plate 15 are gears 40 and 41 respectively. Any convenient method of demountable connection may be used, for example, the ends of the shafts 18 and 38 may be threaded and lock nuts 42 may be used to demountably secure the gears 40 and 41 to said shafts. These gears 40 and 41 are operatively connected to each other by intermeshing as shown or through one or more other gears but preferably in the manner illustrated. The intermittent motion imparted to the gear 40 is in turn imparted to the gear 41 to intermittenly drive the output shaft 18. The gear combination 40—41 may be removed and another combination substituted therefor to vary the magnitude of rotation of the output shaft 18 for each partial rotation (45° as illustrated) of the shaft 38.

Briefly the operation of the apparatus is as follows. The continuously driven shaft 35 continuously drives the worm 37 meshing with the gear 22 to continuously drive the hollow input shaft 21 freely rotatable on output shaft 18 which extends therethrough. The cam 23 is also continuously driven and carries with it drive roller 24 which in predetermined segment of its path of travel during each revolution thereof engages the Geneva wheel 39 and partially rotates it (45° in the illustration). In the period of rotation of the Geneva wheel 39, the cam 23 in contact with the follower roller 32 acts against the action of spring 31 to maintain the lock lever 29 in retracted position whereby the lock tooth 30 is kept out of the path of the lock gear 26. The motion of the Geneva wheel 39 is imparted to the shaft 38 which in turn imparts its motion to the gear 40. The drive gear 40 drives the gear 41 and the degree of turn of the gear 41 is dependent upon the ratio of 40—41. The gear 41 drives the output shaft 18 and table 20 and also the lock gear 26. When the Geneva 39 comes to rest intermittently, so also does the shaft 18 and gear 26 whereupon due to the position of a particular section of the cam 23 with respect to the roller 32, the spring 31 maintains the lever in operative position whereby the lock tooth 30 is in mesh with the gear 26 to lock the shaft 18 intermittently. When it is desired to increase or decrease the number of times that the table 20 is indexed for each eight complete turns of the shaft 19, the particular gears 40—41 are removed and another set of different and desired ratios are substituted therefor. For example, if the ratio of these gears is 1–1 so that the table 20 travels 45° for each 45° intermittent movement of the Geneva 39, and it is desired that the table 20 should travel 90° for each 45° intermittent movement of the Geneva 39, all the operator need do is to remove nuts 42, substitute for the standard 1–1 ratio set of gears, standard 1–2 ratio set of gears and then secure them to the shafts with said nuts 42. Obviously, various other ratio sets of gears may be substituted depending upon the degree of rotary travel of table 20 required for each predetermined partial rotation of shaft 38 controlled by the particular Geneva 39 employed. These changeovers as required may be readily and easily made even by an unskilled workman.

I claim:

1. Mechanism for converting continuous rotary motion to intermittent motion comprising a pair of rotatable members, one of said members adapted to be continuously driven, cooperating means associated with said members and driven by said one of said members during rotation thereof for imparting intermittent rotary motion to the other of said pair of members, an output member, an intermittently rotatable gear connected to and driven by said other of said pair of members, and an intermittently rotatable gear operatively associated with said first mentioned gear and driven thereby, said second mentioned gear connected to said output member for intermittently driving said output member, said output member extending through said one of said pair of members.

2. Mechanism for converting continuous rotary motion to intermittent motion comprising a pair of rotatable members, one of said members adapted to be continuously driven, cooperating means associated with said members and driven by said one of said members during rotation thereof for imparting intermittent rotary motion to the other of said pair of members, an output member, an intermittently rotatable gear demountably connected to and driven by said other of said pair of members, and an intermittently rotatable gear operatively associated with said first mentioned gear and driven thereby, said second mentioned gear demountably connected to said output member for intermittently driving said output member, said output member extending through said one of said pair of members.

3. Mechanism for converting continuous rotary motion to intermittent motion comprising a hollow shaft adapted to be continuously driven, a second shaft, intermittently rotatable means operatively connected to said second shaft, continuously rotatable means operatively connected to said first shaft and continuously driven thereby to act upon said intermittently rotatable means for imparting intermittent rotation thereto and to said second shaft during continuous rotation of said first shaft, a third shaft, a gear coupled with said second shaft and a gear coupled with said third shaft, said gears operatively connected to each other for imparting intermittent rotation to said third shaft upon intermittent rotation of said second shaft, said third shaft extending through said hollow shaft.

4. Mechanism for converting continuous rotary motion to intermittent motion comprising a hollow shaft adapted to be continuously driven, a second shaft, intermittently rotatable means operatively connected to said second shaft, continuously rotatable means operatively connected to said first shaft and continuously driven thereby to act upon said intermittently rotatable means for imparting intermittent rotation thereto and to said second shaft during continuous rotation of said first shaft, a third shaft, a gear demountably coupled with said second shaft and a gear demountably coupled with said third shaft, said gears operatively connected to each other for imparting intermittent rotation to said third shaft upon intermittent rotation of said second shaft, said third shaft extending through said hollow shaft.

5. Mechanism for converting continuous rotary motion to intermittent motion comprising a hollow member adapted to be continuously driven, a shaft, a Geneva wheel operatively connected to said shaft, means operatively connected to said member and driven thereby to act upon said Geneva wheel for imparting intermittent motion thereto and to said shaft during continuous rotation of said member, a second shaft, an intermittently rotatable gear coupled with and driven by said first shaft, and an intermittently rotatable gear associated with and driven by said first gear, said second gear being connected to said second shaft for intermittently driving said second shaft, said second shaft extending through said member.

6. Mechanism for converting continuous rotary motion to intermittent motion comprising a hollow member adapted to be continuously driven, a shaft, a Geneva wheel operatively connected to said shaft, means operatively connected to said member and driven thereby to act upon said Geneva wheel for imparting intermittent motion thereto and to said shaft during continuous rotation of said member, a second shaft, an intermittently rotatable gear demountably coupled with and driven by said first shaft, and an intermittently rotatable gear associated with and driven by said first gear, said second gear being demountably connected to said second shaft for intermittently driving said second shaft, said second shaft extending through said member.

ANTHONY J. VASSELLI.

REFERENCES CITED

The following references are of record in the file of this patent:

UNITED STATES PATENTS

| Number | Name | Date |
|---|---|---|
| 737,010 | Oates et al. | Aug. 25, 1903 |
| 1,643,693 | Black | Sept. 27, 1927 |
| 1,801,969 | Moulton | Apr. 21, 1931 |
| 2,392,320 | Hegy | Jan. 8, 1946 |

FOREIGN PATENTS

| Number | Country | Date |
|---|---|---|
| 426,322 | Great Britain | June 28, 1933 |
| 765,597 | France | June 12, 1934 |